United States Patent [19]

Taubenmann et al.

[11] 4,337,026
[45] Jun. 29, 1982

[54] MOLD-CARRIER ASSEMBLY

[75] Inventors: Peter Taubenmann; Karl-Ludwig Korzeczek, both of Munich, Fed. Rep. of Germany

[73] Assignee: Krauss-Maffei Aktiengesellschaft, Munich, Fed. Rep. of Germany

[21] Appl. No.: 192,824

[22] Filed: Oct. 1, 1980

[30] Foreign Application Priority Data

Oct. 3, 1979 [DE] Fed. Rep. of Germany ....... 2940114

[51] Int. Cl.³ .............................................. B29C 3/00
[52] U.S. Cl. ................................... 425/454; 425/214; 425/451.9; 425/451.5; 425/411
[58] Field of Search .................. 425/450.1, 451, 451.5, 425/451.9, 454, 406, 407, 408, 409, 411, 410, 214

[56] References Cited

U.S. PATENT DOCUMENTS

| 3,444,828 | 5/1969 | Hornlein et al. | 425/408 |
| 3,460,202 | 8/1969 | Graf et al. | 425/214 X |
| 3,464,089 | 9/1969 | Smith | 425/406 X |
| 3,981,671 | 9/1976 | Edwards | 425/408 X |
| 3,986,812 | 10/1976 | Barker et al. | 425/451.5 |
| 4,007,679 | 2/1977 | Edwards | 425/411 X |
| 4,257,145 | 3/1981 | Bovino | 425/408 X |

Primary Examiner—J. Howard Flint, Jr.
Attorney, Agent, or Firm—Karl F. Ross

[57] ABSTRACT

A mold-handling apparatus in which a pair of mold carriers can be locked together for the molding process but, upon separation, each tilts through 45° to afford improved access to the mold halves following a molding operation or before a molding operation. According to the invention, the upper mold carrier is swung about a fixed axis by a fluid-operated cylinder while another fluid-operated cylinder shifts a slider vertically to lower the pivot of the lower mold carrier and enable the latter to engage abutments which tilt the lower carrier.

10 Claims, 3 Drawing Figures

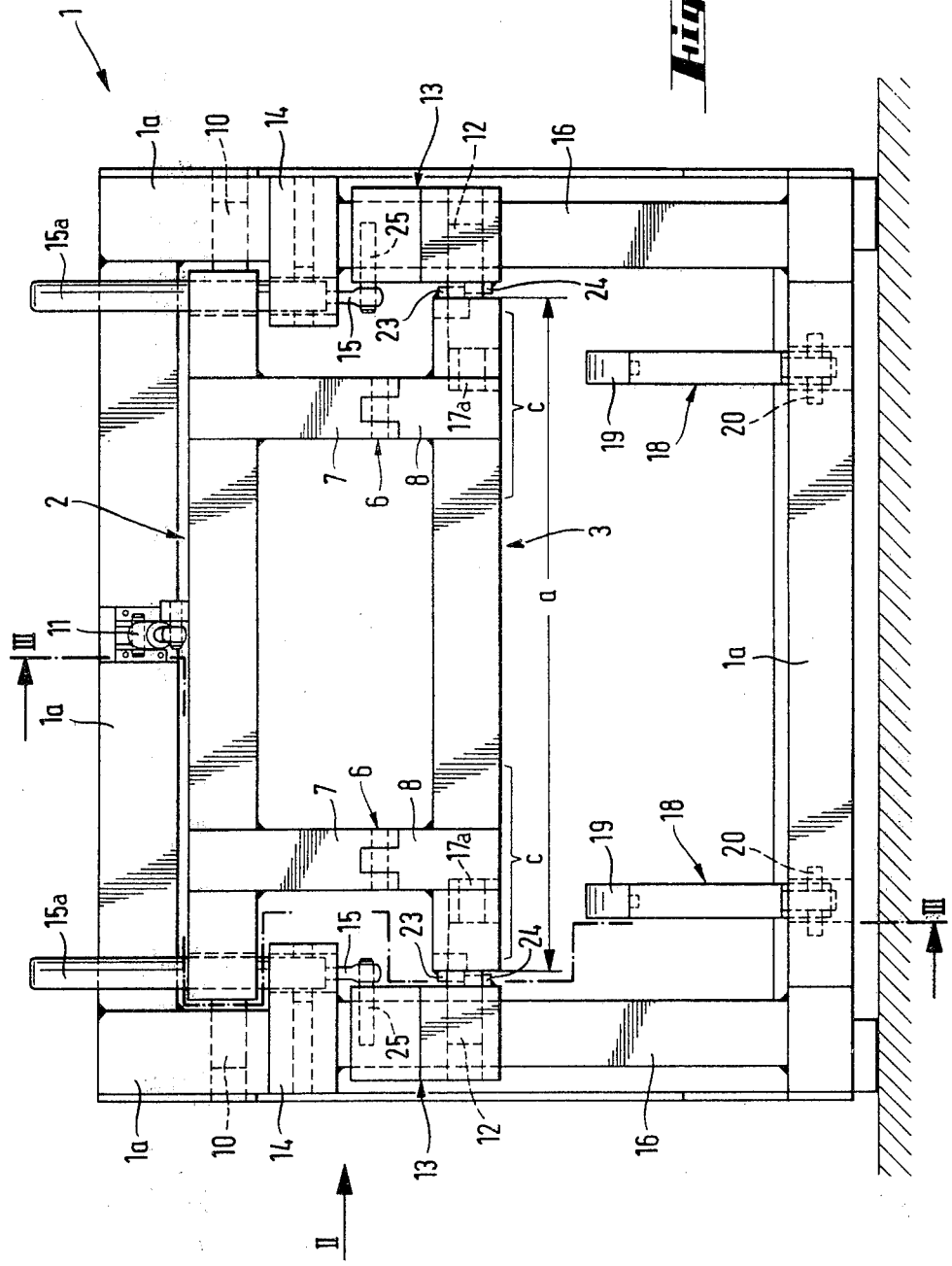

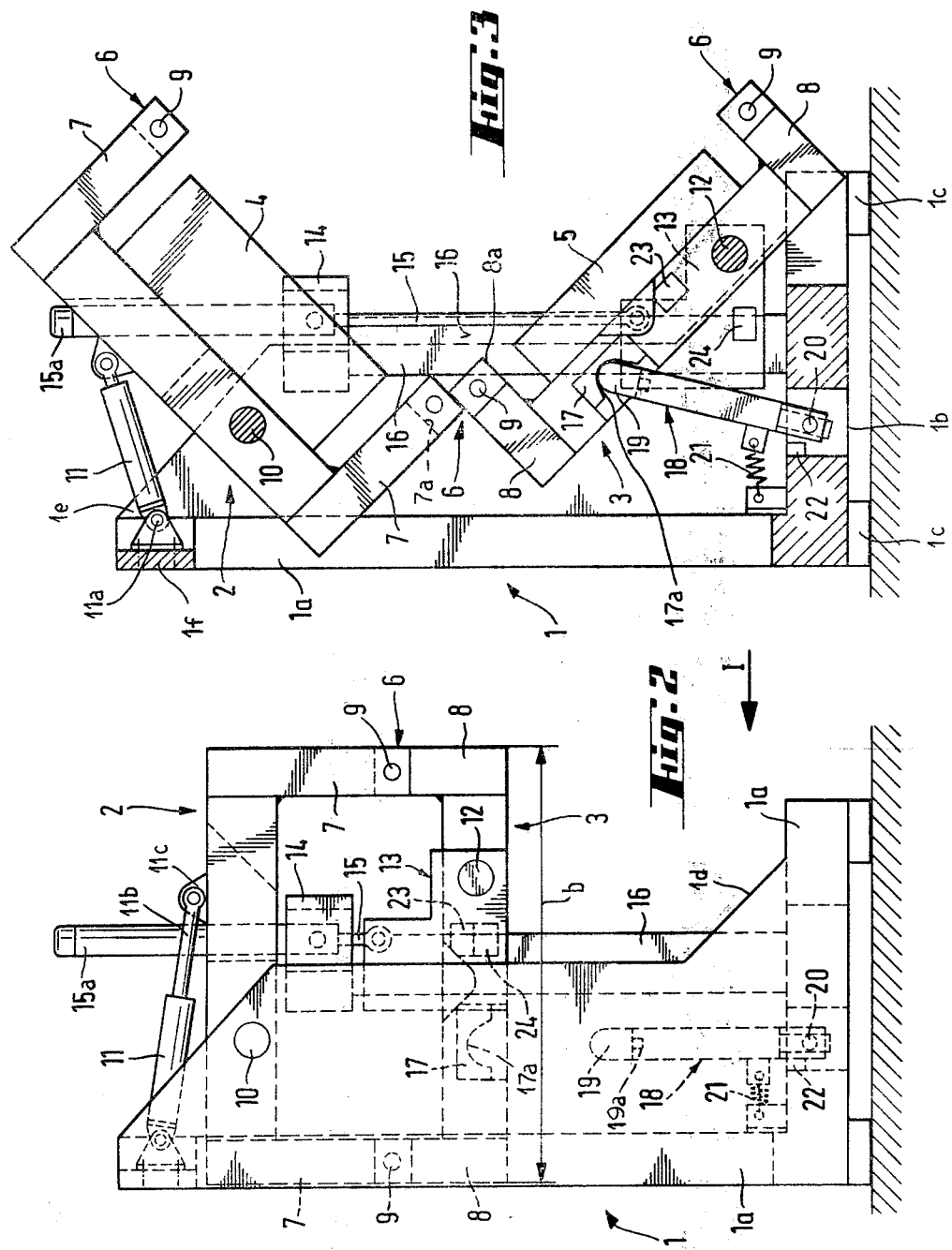

MOLD-CARRIER ASSEMBLY

FIELD OF THE INVENTION

Our present invention relates to mold-handling apparatus and, more particularly, to a mold-carrier assembly having a pair of mold carriers each adapted to receive a respective mold part for holding them in a closed position or for spreading them apart to open the mold.

BACKGROUND OF THE INVENTION

In the molding of synthetic resin materials by injection molding or die-casting processes or in similar techniques utilizing a pair of mold parts which together define a mold cavity, it is common practice to provide each of the mold parts upon a respective mold cavity and to mount the mold carriers movably in a mold-handling assembly.

The purpose of the assembly is to close the mold parts together and hold them in place for a molding operation which can be effected at relatively high pressure, or to spread the mold members apart, thereby enabling a molded object to be removed, the mold part to be cleaned, or the cavity to be inspected.

Especially when relatively large objects are to be fabricated in a mold, the standard method of simply moving the mold parts together or drawing them apart for opening and closing of the mold, is not always satisfactory since the spread of the two mold parts must be quite considerable to allow access to all regions of the mold cavity.

It has been proposed to provide the mold-handling assembly in such manner that upon opening of the mold, the mold carriers can be swung in opposite senses through about 45° so that the opening between the mold parts diverges forwardly with an angle of about 90°, i.e. a large mouth is provided for access to the mold. Such a mold-handling unit is described in German patent document (Printed Application—Auslegeschrift) DE-AS No. 26 25 232 (see also U.S. Pat. No. 3,981,671). In this system, each of the mold carriers is swung by respective cylinders about respective pivot axes and still other cylinders are provided for moving the plates or carriers toward or away from one another.

The system of this publication, moreover, has been found to be especially effective for the production of large articles e.g. automotive body components, from thermosetting or other reactive synthetic resin materials. A significant disadvantage is that it requires three distinct drives.

In German patent document (Open Application—Offenlegungsschrift) DE-OS No. 25 44 774, another system for pivoting a mold carrier is described and tilting arrangement also can be found, albeit for different purposes (see also U.S. Pat. No. 3,986,812).

OBJECTS OF THE INVENTION

It is the principal object of the present invention to provide an improved mold-handling apparatus whereby disadvantages of the prior art discussed above are avoided and which, with a limited number of drives, can nevertheless provide for a widely spread mouth and particularly convenient and facile manipulation of the mold parts.

Yet another object of the invention is to provide a low cost handling apparatus which is especially effective for the fabrication of large-size objects.

SUMMARY OF THE INVENTION

These objects and others which will become apparent hereinafter are attained, in accordance with the present invention which provides a pair of mold carriers on a support, including an upper mold carrier which is tiltable on an upper horizontal axis by a fluid cylinder, and a lower mold carrier which is vertically shiftable on a slide by a respective cylinder.

According to the invention, the two mold carriers or plates can be locked together directly while the lower carrier is associated with a vertically shiftable abutment which supports the lower carrier horizontally until lower carrier engages a stop upon displacement of the slider vertically.

More particularly, the pivot axis of the lower carrier is disposed between the point at which this carrier is engaged by the stop and the forward edge of the lower carrier. The abutment on the slider is provided rearwardly of the pivot, i.e. between the latter and the rear edge of the carrier.

When the locking pins are released, therefore, the upper cylinder can tilt its mold part in one sense while the other mold part is tilted in the opposite sense.

According to another feature of the invention, the cylinder for displacing the lower carrier engages between the pivot axis thereof and the abutment on the slider.

The locking means advantageously includes four individual locks which lie in the region of the corners of the mold-carrying plates which are of rectangular or square plan configuration.

A pair of stops can project upwardly from the base and engage the lower carrier at regions corresponding to the longitudinal regions of the locking devices.

When the length of the mold-carrying plate is greater than its width, each short side is provided with a respective cylinder for vertically displacing the plate along the guide.

The system of the present invention thus uses a single drive for both the tilting movement and the opening movement of the lower mold-carrying plate (mold carrier). The stop or stops which engage the latter are advantageously bars which are upstanding from the base of the support and, according to the invention, can be pivotally mounted upon this base and biased into a fully erect position. When the lower mold carrier engages these bars, however, it can swing the bars somewhat forwardly to enable the rear end of the lower mold carrier to move forwardly at least to a limited degree and facilitate access to the mold part thereon.

The vertically displaceable slides which carry the pivot for the lower mold carrier advantageously have fixed stops which engage outrigger abutments on the lower mold carrier to positively define the horizontal position of the latter when it is not engaged by the stop bars. Since the pivot is located relatively forwardly, the center of gravity is disposed such that the weight of the lower mold carrier holds it against the abutments on the slides.

According to another feature of the invention, the stop bars or rods can be removable or shifted so that they do not engage the lower mold carrier, in which case the movement of the lower mold carrier through the entire stroke of the slides is parallel to itself, i.e. the carrier remains horizontal and is not tilted.

The effective length of each stop bar can be varied in accordance with yet another feature of the invention by substituting replaceable heads on the bars.

According to yet another feature of the invention, on both sides of both pivots the mold carriers can be locked together in their closed positions, thereby enabling the forces generated on molding to be taken up by the locking pins and the like rather than by the various systems. When the mold carriers are rectangular, four locking pins can be provided for joining the interfitting locking formations at the corners of the rectangular or square mold corners.

The motions of all of the movable parts are positively determined when the sliders flank the mold carriers and are guided on a pair of upright posts which are disposed immediately alongside the short edges of the rectangular mold carriers.

BRIEF DESCRIPTION OF THE DRAWING

The above and other objects, features and advantages of the present invention will become more readily apparent from the following description, reference being made to the accompanying drawing in which:

FIG. 1 is a front elevational view of the mold-handling device of the present invention, the two mold parts being omitted although the carriers are shown in the closed-mold position;

FIG. 2 is a side elevational view of the device as seen in the direction of arrow II of FIG. 1 which, in turn, corresponds to a view in the direction of arrow I of FIG. 2; and FIG. 3 is a cross-sectional view taken along the line III—III of FIG. 1 but showing the mold parts in place (although not in section) and the mold carriers in the open position.

SPECIFIC DESCRIPTION

The mold-handling device 1 shown in the drawing comprises a support or frame 1a which has a base 1b mounted on feet 1c, a pair of lateral walls 1d and 1e, and a rear wall 1f.

The upper mold-carrying plate 2 is pivoted at a fixed pivot 10 to this support and cooperates with a lower mold-carrying plate 3, the two plates being adapted to receive mold members, e.g. mold halves, 4 and 5 as shown in FIG. 3. The members 4 and 5, of course, form the tool of the device.

The mold-carrying plates 2 and 3 are rectangular and have lengths a exceeding their widths b and substantially at corners of a rectangle or at least along the longitudinal edges thereof, the two plates are provided with locking devices represented at 6. Thus four such locking devices are provided.

Each locking device comprises an arm 7 of the plate 2 which is aligned with an arm 8 of the plate 3 in the closed position of the apparatus, these arms having interfitting formations, such as a tongue 8a and a groove 7a through which holes 9 register to receive pins (not shown) which are introduced laterally.

The locking devices thus enable the two plates to be rigidly secured together with the mold 4 and 5 held against one another sufficiently to resist molding pressures.

As noted, the upper mold-carrying plate 2 is connected by pins 10 pivotally to the frame 1a so that it can swing in the counterclockwise sense (FIGS. 2 and 3) about a horizontal axis through about 45°.

To this end, a hydraulic cylinder 11 is pivotally connected to 11a to the frame 1a and has its piston 11b pivotally connected at 11c to the upper mold carrier 2. Extension of the piston (compare FIGS. 3 and 2) lowers the mold carrier into its horizontal position while retraction of the piston tilts the upper mold carrier rearwardly through about 45°.

The lower mold carrier 3 is also pivoted on pins (pins 12) but not at a fixed location. The pins 12 are mounted in a pair of slides 13 which are articulated to piston rods 15 by pins 25, the piston rods being received in cylinders 15a mounted on the frame by brackets 14 at upper ends of vertical posts or beams 16 which serve as guides for the slider.

When the cylinders 15a are energized and the pistons 15 extended (compare FIGS. 2 and 3) the sliders 13 are lowered along the guides 17 which flank the mold-carrying plates and are disposed along the short edges thereof.

FIGS. 1 and 2 show the two mold-carrying plates 2 and 3 in horizontal closed positions corresponding to the position in which they are locked at 6 together. In this case, the lower mold carrier 3 is in its uppermost position.

When the mold carrier 3 is lowered, upon release of the locks 6 and downward movement of the sliders 13, the lower mold carrier engages with its outrigger pieces 17, a pair of stop bars 18. The stop bars 18 have rounded heads 19 positioned to slip into the downwardly open pockets 17a formed on the outrigger pieces 17 (see FIG. 2).

The stop bars 18 are, in turn, pivotally mounted in the base 1b for tilting movement about a horizontal axis defined by pivot pins 20 (compare FIGS. 2 and 3).

Respective springs 21 draw the stops 18 against respective abutments 22 whereby the stop bars are held in fully erect positions (FIG. 2) until they are engaged by the lower mold plate 3.

Thus the stop bars 18 limit the downward movement of at least the rear portions of the lower mold plate 3. Since the piston rods 15 continue their downward movement, the lower mold plate 3 is tilted in a clockwise sense about the axis of pivots 12 until this mold plate assumes a position about 45° to the horizontal. The heads 19 are provided with threaded pins 19a which engage in female threads of the bars 18 so that heads 19 of different lengths can be substituted thereby enabling the degree of tilt to be adjusted as desired.

When the piston rods 15 are retracted upwardly by the cylinders 15a, the pivot 12 rises and the mold carrier 3 rotates in the counterclockwise sense relative to the slider 13. Since the center of gravity of the lower mold carrier lies rearwardly of the pivot 12, i.e. between this pivot and the rear edge, the weight of the mold carrier brings a pair of lateral abutments 23 thereon to rest upon inwardly extending abutments 24 on the slider 13, thereby defining a horizontal position for the lower mold carrier. Continued upward movement of the sliders lifts the pockets 17a of the stop bars 18, thereby allowing the latter to return to their erect positions.

When these stop bars are removed entirely, the lower mold carrier can be lowered without being tilted.

The regions c at which the locking devices are provided preferably are formed with pockets 17a as indicated in FIG. 1.

We claim:

1. A mold-handling device for a pair of mold parts defining a molding tool, said device comprising:

a support;

an upper mold-carrying plate adapted to receive one of said parts and pivotally mounted on said support;

a lower mold-carrying plate engageable with said upper mold-carrying plate in a closed position of said plates;

locking means on said plates for directly fixing said plates together in said closed position;

means for raising and lowering said lower mold-carrying plate on said support, said lower mold-carrying plate being pivotally connected to the latter means at a respective pivot axis; and at least one upwardly extending stop bar on said support engageable with said lower mold-carrying plate upon the lowering of said axis, thereby tilting said lower mold-carrying plate about said axis, said lower mold-carrying plate and said means for raising and lowering being provided with mutually engageable abutments for supporting said lower mold-carrying plate in a horizontal position upon raising of said axis.

2. The device defined in claim 1 wherein said abutments are disposed between said axis and a rear edge of said lower mold-carrying plate and the center of gravity of said lower mold-carrying plate is disposed between said axis and said rear edge.

3. The device defined in claim 2 wherein said stop bar is positioned to engage said lower mold-carrying plate between said axis and said rear edge.

4. The device defined in claim 1 wherein said means for raising and lowering includes a pair of slides disposed to opposite sides of said plates, said support being formed with upright guides upon which said slides are displaceable, said slides being formed with pivots defining said axis, and respective cylinders connected to said slides for displacing same along said guides, said slides being formed with inwardly projecting abutments engageable with said abutments of said lower mold-carrying plate.

5. The device defined in claim 4 wherein said cylinders are connected to said slides between said axis and the respective inwardly projecting abutment.

6. The device defined in claim 1 wherein said plates are rectangular and said locking means are provided at four corners of a rectangle in respective locking regions, of the lengths of said plates, at least two stop bars being provided, each in one of said regions.

7. The device defined in claim 1 wherein said plates have rectangular configurations and said means for raising and lowering said plates is disposed along small sides of the rectangles, said stop bar being disposed inwardly of the small sides of said rectangles.

8. The device defined in claim 1 wherein two such stop bars are provided and each of said stops is pivotally mounted on said support for forward tilting movement upon engagement with said lower mold-carrying plate.

9. The device defined in claim 8 wherein said lower mold-carrying plate is formed with a pair of pockets each adapted to receive a respective one of said stop bars.

10. The device defined in claim 9 wherein each of said stop bars is formed with a replaceable head enabling adjustment of the effective length of the stop bar.

* * * * *